(12) United States Patent
Chea et al.

(10) Patent No.: US 9,840,193 B1
(45) Date of Patent: Dec. 12, 2017

(54) VEHICLE LIGHTING ASSEMBLY

(71) Applicant: Ford Global Technologies, LLC, Dearborn, MI (US)

(72) Inventors: Vichit Chea, Berkley, MI (US); Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/211,333

(22) Filed: Jul. 15, 2016

(51) Int. Cl.
*B60Q 1/00* (2006.01)
*B60Q 1/26* (2006.01)
*B60Q 11/00* (2006.01)
*B60Q 3/06* (2006.01)

(52) U.S. Cl.
CPC ............ *B60Q 3/06* (2013.01); *B60Q 2500/00* (2013.01)

(58) Field of Classification Search
CPC ... B60C 1/2661; B60C 1/2669; B60C 1/2696; B60C 1/50; B60C 1/503; B60C 1/52; B60C 3/217; B60C 3/30
USPC ......................................... 362/496, 509–510
See application file for complete search history.

(56) References Cited

U.S. PATENT DOCUMENTS

| 2,486,859 | A | 11/1949 | Meijer et al. |
| 3,255,725 | A | 6/1966 | Von Kreidner et al. |
| 4,192,090 | A | 3/1980 | Seth |
| 5,053,930 | A | 10/1991 | Benavides |
| 5,580,153 | A | 12/1996 | Motz |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,254,261 | B1 | 7/2001 | Bingle et al. |
| 6,260,988 | B1 | 7/2001 | Misawa et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,015,893 | B2 | 3/2006 | Li et al. |
| 7,161,472 | B2 | 1/2007 | Strumolo et al. |
| 7,213,923 | B2 | 5/2007 | Liu et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle is provided herein that includes a door coupled to a body structure of a vehicle. The door is movable between a first and a second position to provide access to an interior portion of the vehicle. A photoluminescent structure is disposed on the door and is configured to luminesce in response to excitation light emitted by a light source. The light source is vertically disposed below the photoluminescent structure on the door in both the first and second positions.

17 Claims, 10 Drawing Sheets

(56) References Cited

U.S. PATENT DOCUMENTS

| | | |
|---|---|---|
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,404,372 B2 | 7/2008 | Aasgaard |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,442,888 B2 | 9/2016 | Stanfield et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0128888 A1 | 7/2004 | Payan et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0300462 A1 | 10/2014 | Russ |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

VEHICLE LIGHTING ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle includes a door coupled to a body structure of a vehicle. The door is movable between first and second positions to provide access to an interior portion of the vehicle. A photoluminescent structure is disposed on the door and is configured to luminesce in response to excitation light emitted by a light source. The light source is vertically disposed below the photoluminescent structure on the door in both the first and second positions.

According to another aspect of the present disclosure, a vehicle includes a cargo shade assembly disposed in a cargo compartment that is movable between first and second positions. A first light source is operably coupled with a first photoluminescent structure in both the first and second positions. The first photoluminescent structure is configured to luminesce in response to excitation by the first light source.

According to yet another aspect of the present disclosure, a vehicle includes a panel that is movable between a first and a second position disposed over a cargo compartment of the vehicle. A photoluminescent structure is disposed on the panel and configured to luminesce in response to excitation by a light source. The light source is operably coupled with the photoluminescent structure in both the first and second positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
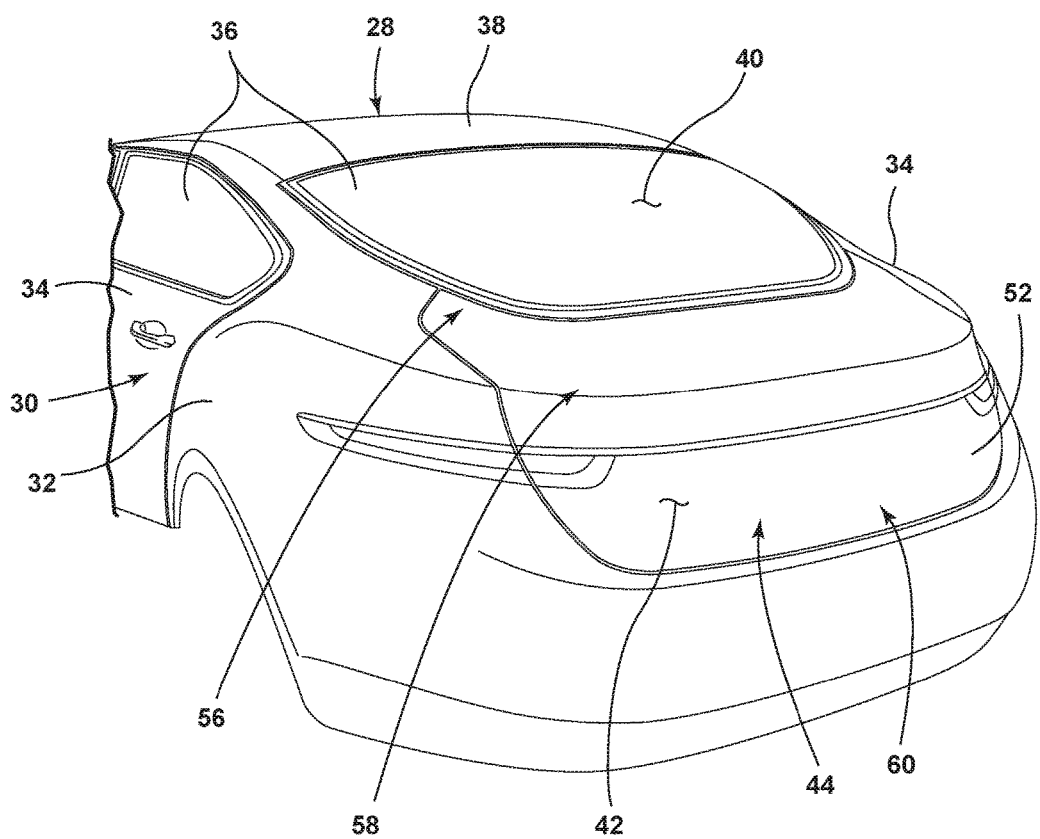
FIG. 2 is a rear partial perspective view of a vehicle incorporating a lighting assembly within an interior compartment of the vehicle, according to one aspect.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting assembly for a vehicle. The lighting assembly may advantageously employ one or more photoluminescent structures that are configured to illuminate in response to pre-defined events. The one or more photoluminescent structures may be configured to convert light received from an associated light source and re-emit the light at a different wavelength typically found in the visible spectrum.

Figure 1A:
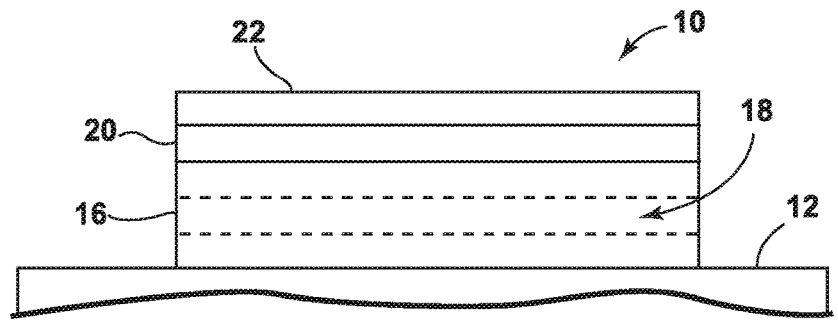
FIG. 1A is a side view of a photoluminescent structure rendered as a coating for use in a photoluminescent latch assembly according to one aspect.
Figure 1B:
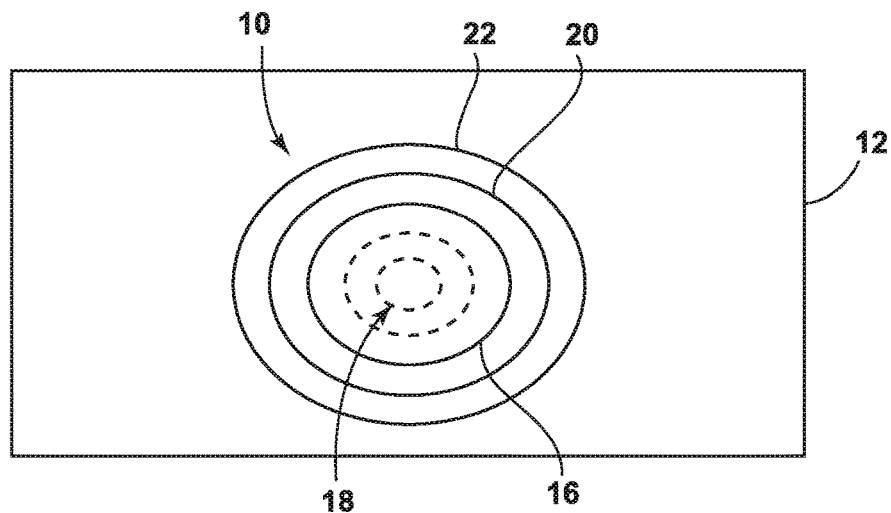
FIG. 1B is a top view of a photoluminescent structure rendered as a discrete particle according to one aspect.
Figure 1C:
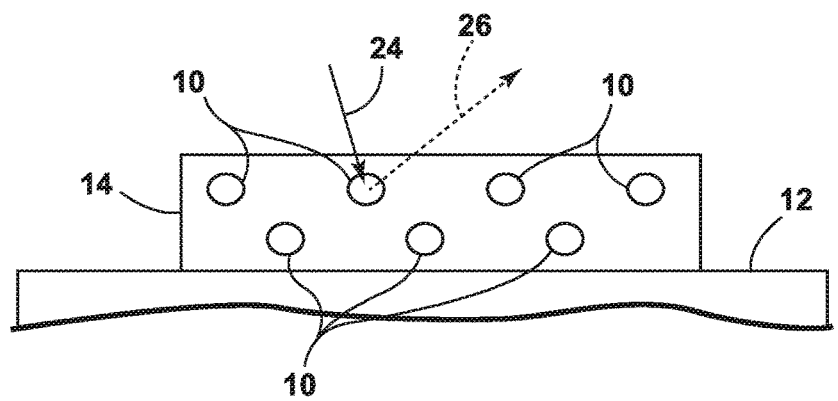
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 72 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 72. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 72). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light source 72 that emits the excitation light 24, including, but not limited to, natural light sources (e.g., the sun) and/or any artificial light source 72. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 3:
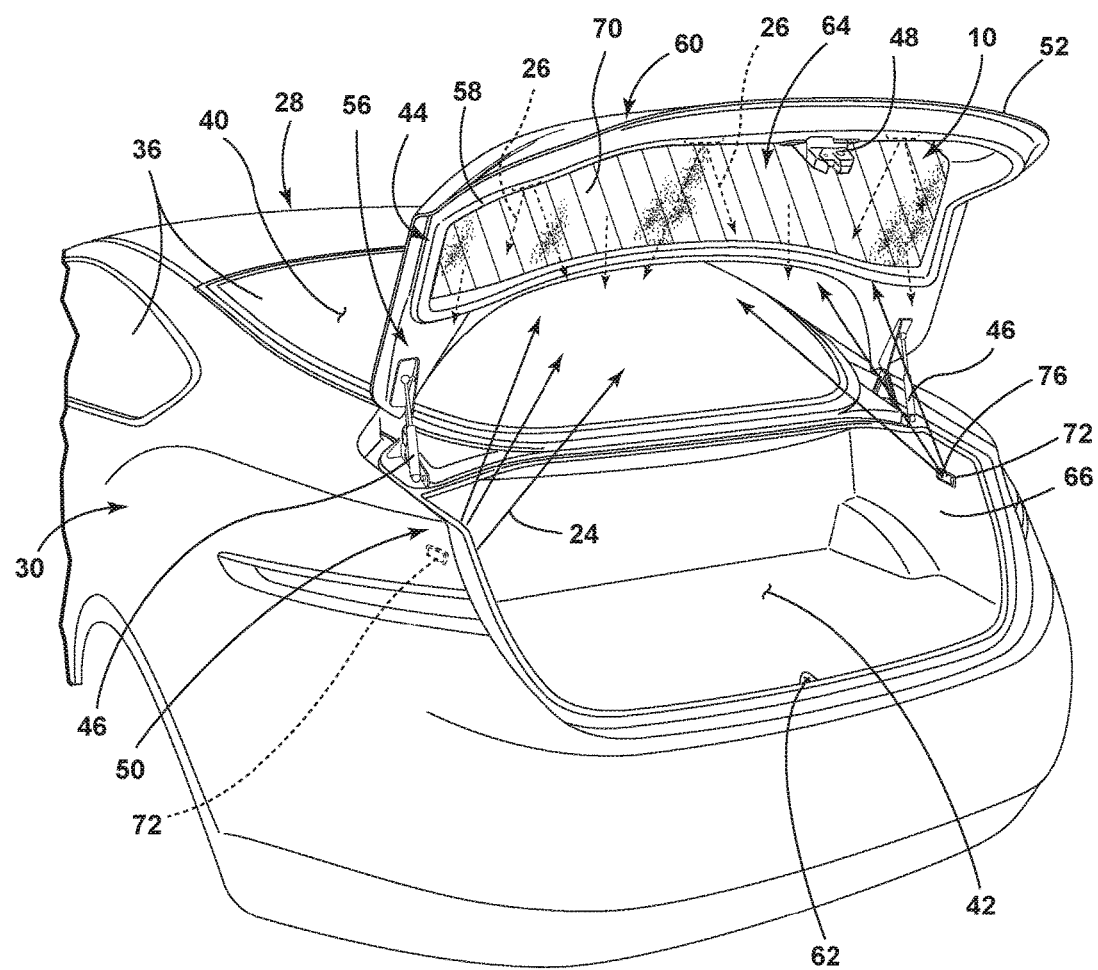
FIG. 3 is a rear partial perspective view of the vehicle having a rear door in an open position having the lighting assembly within a cargo compartment, according to one aspect.

With reference to FIGS. 2 and 3, a vehicle 28 generally includes a body 30, a chassis, and a power train driving the road wheels to move the vehicle 28. The body 30 generally includes side panels 32, doors 34, windows 36, and a roof 38 that generally defines a passenger compartment 40 of the vehicle 28. One or more of the doors may provide access to the passenger compartment 40 and/or a cargo compartment 42. For example, the cargo compartment 42 may be accessible through a rear door 44, which may be configured as a trunk lid 52 or a hatch 54. The rear door 44 is movably attached to one or more of the proximately disposed panels 32 of the vehicle 28 such that the rear door 44 can be moved from a closed position (FIG. 2) to an open position (FIG. 3). In some embodiments, gas springs 46 may assist in movement of the rear door 44 when a latch 48 is released. As will be described in greater detail below, a lighting assembly 50 may be used in conjunction with the rear door 44 to provide illumination proximately thereto. It will be appreciated that any door, or movable panel, disposed on the vehicle 28, including, but not limited to, a trunk lid 52, a hatch 54, a tailgate, a laterally disposed door, a hood, a gas cap, etc. may include the lighting assembly 50 set forth herein without departing from the spirit of the present disclosure.

Referring to FIG. 3, the trunk lid 52, according to one embodiment, may include a front portion 56, a rear portion 58, and a downwardly extending portion 60. A pair of gas springs 46 is coupled to the front portion 56 and a stationary panel 32 of the vehicle 28 to movably and/or rotatably interconnect the trunk lid 52 to the body 30. The trunk lid 52 may be selectively retained in a closed position by a conventional latch 48 and striker 62. The latch 48 may be operably connected to a button by a mechanical cable, or the latch 48 may be powered to permit remote release.

Figure 5:
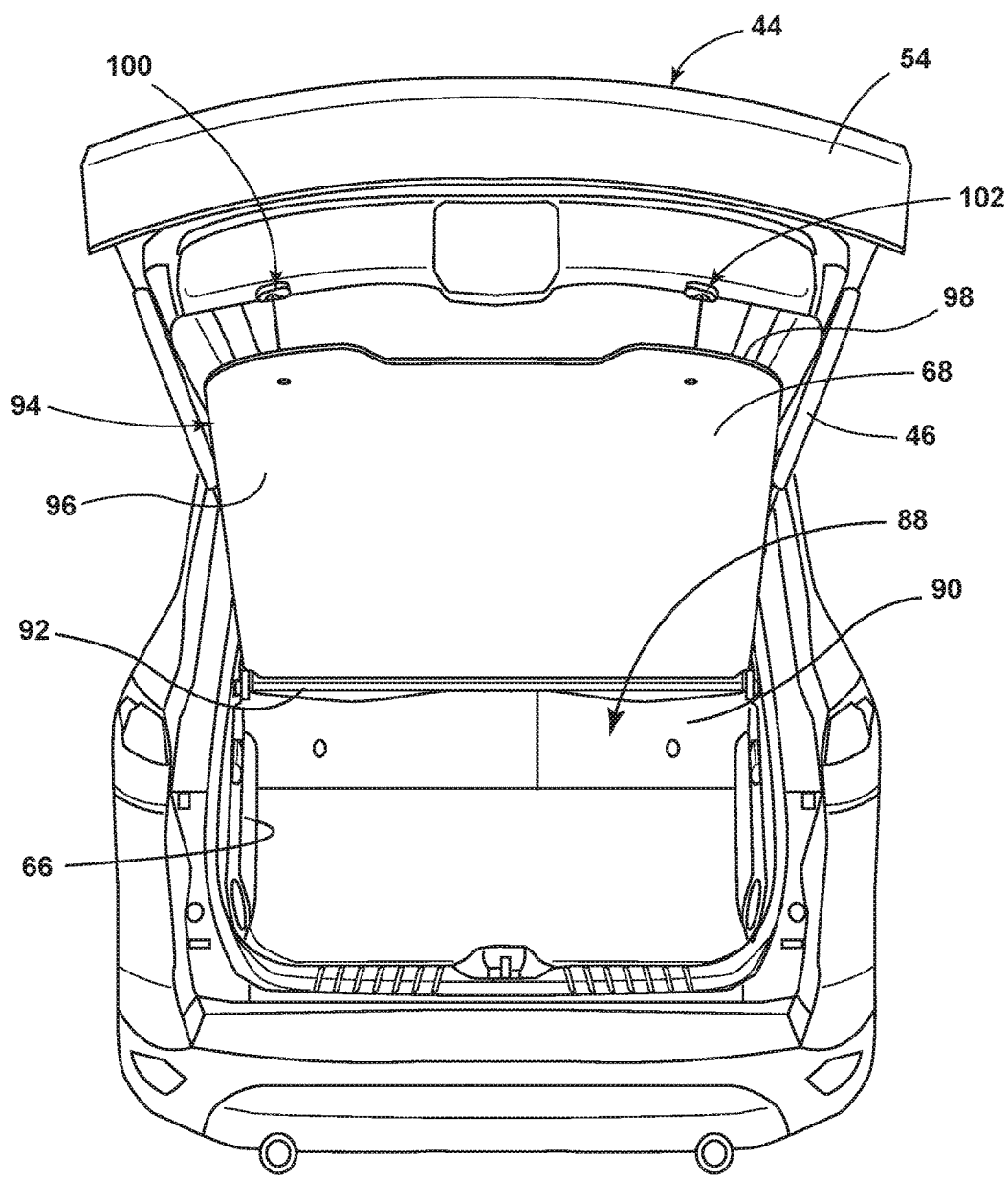
FIG. 5 is a rear perspective view of the vehicle cargo compartment having a cargo shade assembly, according to one aspect.

The trunk lid 52 includes the photoluminescent structure 10 on an interior surface 64 thereof, or any other interior panel 66 that may be disposed within the cargo compartment 42. Additionally, or alternatively, as will be described in greater detail below, the photoluminescent structure 10 may be disposed on a cargo shade assembly 68 (FIG. 5). In some embodiments, the rear door 44, the cargo shade assembly 68, and/or any other panel 32 disposed within the vehicle 28 may be movable from a first position to a second position when the cargo compartment 42 moves from an inaccessible to and accessible state.

As is known in the art, the interior surface 64 of the trunk lid 52 may include a trim material 70, which may be rigid material, a fabric, or any other material thereon for creating a desired aesthetic appearance for the vehicle 28. The photoluminescent structure 10 may be disposed on, or integrated into, the interior surface 64 of the trunk lid 52 and/or the trim material 70.

The lighting assembly 50 includes a light source 72, which may be disposed on a printed circuit board (PCB). The lighting assembly 50 may be disposed on, or integrated into, the cargo compartment 42. A controller 74 (FIG. 10), and corresponding wiring, may be operably coupled with the light source 72. Additionally, optics 76 may be utilized for directing the excitation light 24 emitted from the light source 72 towards a predefined location, such as the photoluminescent structure 10 disposed on the trim material 70. In response to receiving the excitation light 24, the photoluminescent structure 10 may luminesce. As discussed above, the photoluminescent material 18 may incorporate a long persistence photoluminescent material 18 such that upon excitement by the light source 72, the photoluminescent structure 10 continues to illuminate after the source returns to an unilluminated state.

The light source 72 may comprise any form of light source. For example fluorescent lighting, light emitting diodes (LEDs), organic LEDs (OLEDs), polymer LEDs (PLEDs), solid state lighting, or any other form of lighting configured to emit light may be utilized. According to one embodiment, the light source 72 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs. According to one embodiment, LEDs may be printed onto an inner surface of the trunk lid 52 and configured to direct light towards the trim material 70. Additional information regarding the construction of vehicle components incorporating printed LEDs therein is disclosed in U.S. Patent Application Publication No. 2015/0375678 to Salter et al., entitled "ILLUMINATED STEERING ASSEMBLY," the entire disclosure of which is hereby incorporated herein by reference.

In operation, the light source 72 may be activated by the controller 74 using a variety of means. For example, the illumination assembly may be operably coupled with a user interface 78 (FIG. 10) and/or a human machine interface (HMI) 80 (FIG. 10) disposed within the vehicle 28. The user interface 78 may be configured such that a user may control the wavelength of excitation light 24 that is emitted by the light source 72. Additionally, or alternatively, the user interface 78 may be used to switch the illumination assembly through a plurality of modes and/or functions. The user interface 78 may use any type of control known in the art for controlling the light source 72, such as, but not limited to, switches (e.g., proximity sensors, push-type buttons) and may be disposed in any practicable location.

The photoluminescent material 18 is formulated to have an absorption spectrum that includes the emission wavelength of the excitation light 24 supplied from the light source 72. The photoluminescent material 18 is also formulated to have a Stokes shift resulting in the converted visible outputted light 26 having an emission spectrum expressed in a desired color, which may vary per lighting application. In response, the photoluminescent structure 10, and thus, the interior surface 64 of the trunk lid 52 may luminesce.

Figure 4:
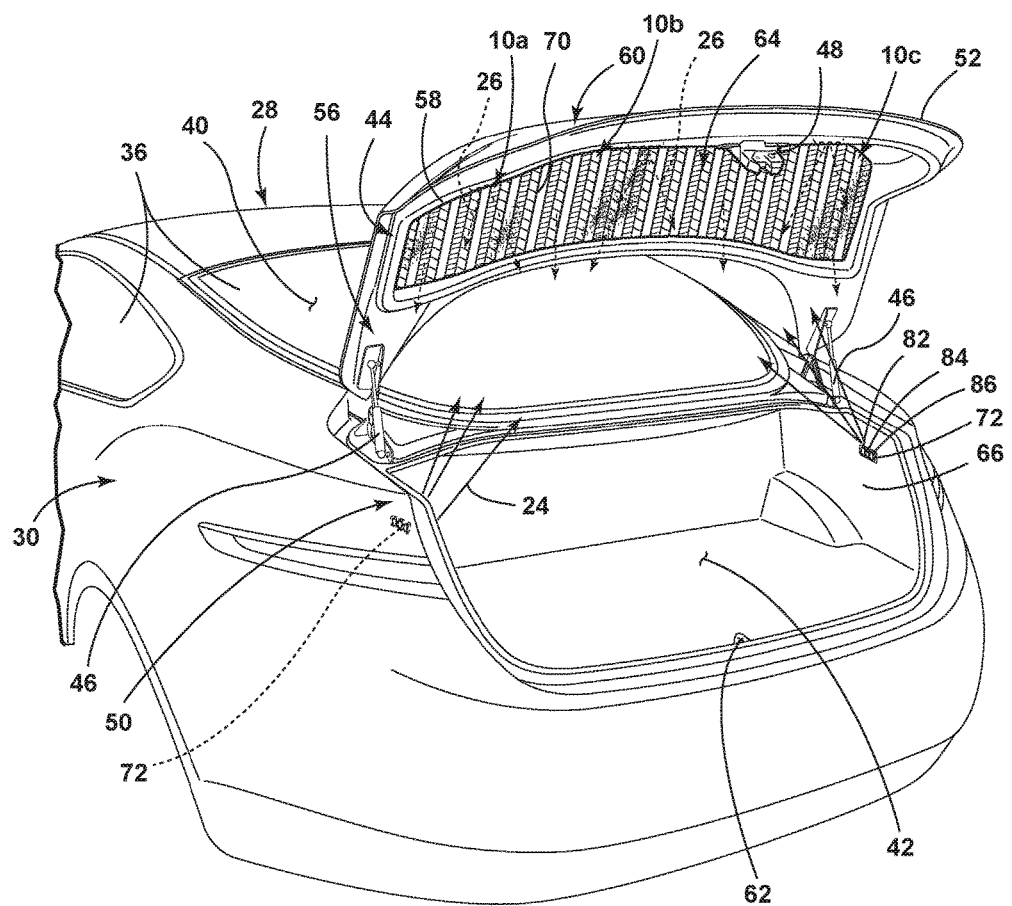
FIG. 4 is a rear partial perspective view of the vehicle having a plurality of photoluminescent structures on an interior surface of the rear door, according to one aspect.

Referring to FIG. 4, the trunk lid 52 may incorporate a plurality of photoluminescent structures 10a, 10b, 10c on the trim material 70 and/or the interior surface 64 of the trunk lid 52. The light source 72 may be configured to emit excitation light 24 at a plurality of wavelengths such that each photoluminescent structure 10a, 10b, 10c may be independently illuminated, such that certain features or patterns may be selectively illuminated. The plurality of photoluminescent structures 10a, 10b, 10c may include any number of photoluminescent materials 18 therein that are disposed on and/or within the photoluminescent structure 10 in any matter.

Additionally, or alternatively, a first light source 82 may emit excitation light 24 at a first wavelength causing the first photoluminescent structure 10a to luminesce. Likewise, a second light source 84 may emit excitation light 24 at a second wavelength thereby causing the second photoluminescent structure 10b to luminesce. A third light source 86 may emit excitation light 24 at a third wavelength thereby causing the third photoluminescent structure 10c to luminesce. Moreover, any of the light sources 82, 84, 86 may illuminate simultaneously such that the interior surface 64 of the trunk lid 52 luminesces in a color that is an additive mixture of the first, second, and/or third photoluminescent structures 10a, 10b, 10c. It will be appreciated that any number of light sources 82, 84, 86 may be utilized that are each capable of outputting one or more wavelengths of excitation light 24. Similarly, the trunk lid 52, or any other vehicle feature, may include any number of photoluminescent structures 10 thereon that are operably coupled with the one or more light sources 82, 84, 86 to generate a wide range of illumination effects and patterns.

According to one embodiment, the first photoluminescent structure 10a may luminesce in a red color, the second photoluminescent structure 10b may luminesce in a green color, and the third photoluminescent structure 10c may luminesce in a blue color. The first, second, and third photoluminescent structures 10a, 10b, 10c may be disposed on the trim material 70 in close proximity to one another. For example, thin stripes of each photoluminescent structure 10a, 10b, 10c may be disposed adjacently to one another.

Each of the first, second, and third photoluminescent structures 10a, 10b, 10c may be illuminated by an independent light source (e.g., light sources 82, 84, 86), or a single light source 72 may emit multiple wavelengths of excitation light 24 to independently illuminate each of the first, second, and third photoluminescent structures 10a, 10b, 10c. Through the use of first, second, and third photoluminescent structures 10a, 10b, 10c each luminescing in a unique color, the additive combination of the luminescence may create a wide range of color variations, and possibly images or graphics, based on controlled excitation light 24 emitted by the one or more light sources 82, 84, 86.

Referring to FIG. 5, the vehicle 28 includes a cargo shade or cover shade assembly 68 that may releasably connect to a rear portion 88 of a vehicle seat 90, a vehicle interior panel 66, and/or any other component with the vehicle 28.

The cargo shade assembly 68 also includes an elongated roller 92. A flexible sheet 94 may be wound around the elongated roller 92. The sheet 94 may have a first side 96 that is coupled to the elongate roller and a second side 98 that may extend away from the roller when the sheet 94 is moved from a retracted position to an extended position. The elongated roller 92 may be torsionally biased by a spring or the like to generate tension acting on the sheet 94 in the extended position. The sheet 94 may be held in the extended position through an attachment assembly 100 on the second side 98 of the sheet 94 that cooperates with a corresponding attachment assembly 102 that is disposed on an interior panel 66 of the vehicle 28, the hatch 54 of the vehicle 28, and/or any other component within the vehicle 28 to maintain the sheet 94 in the extended position.

Figure 6:
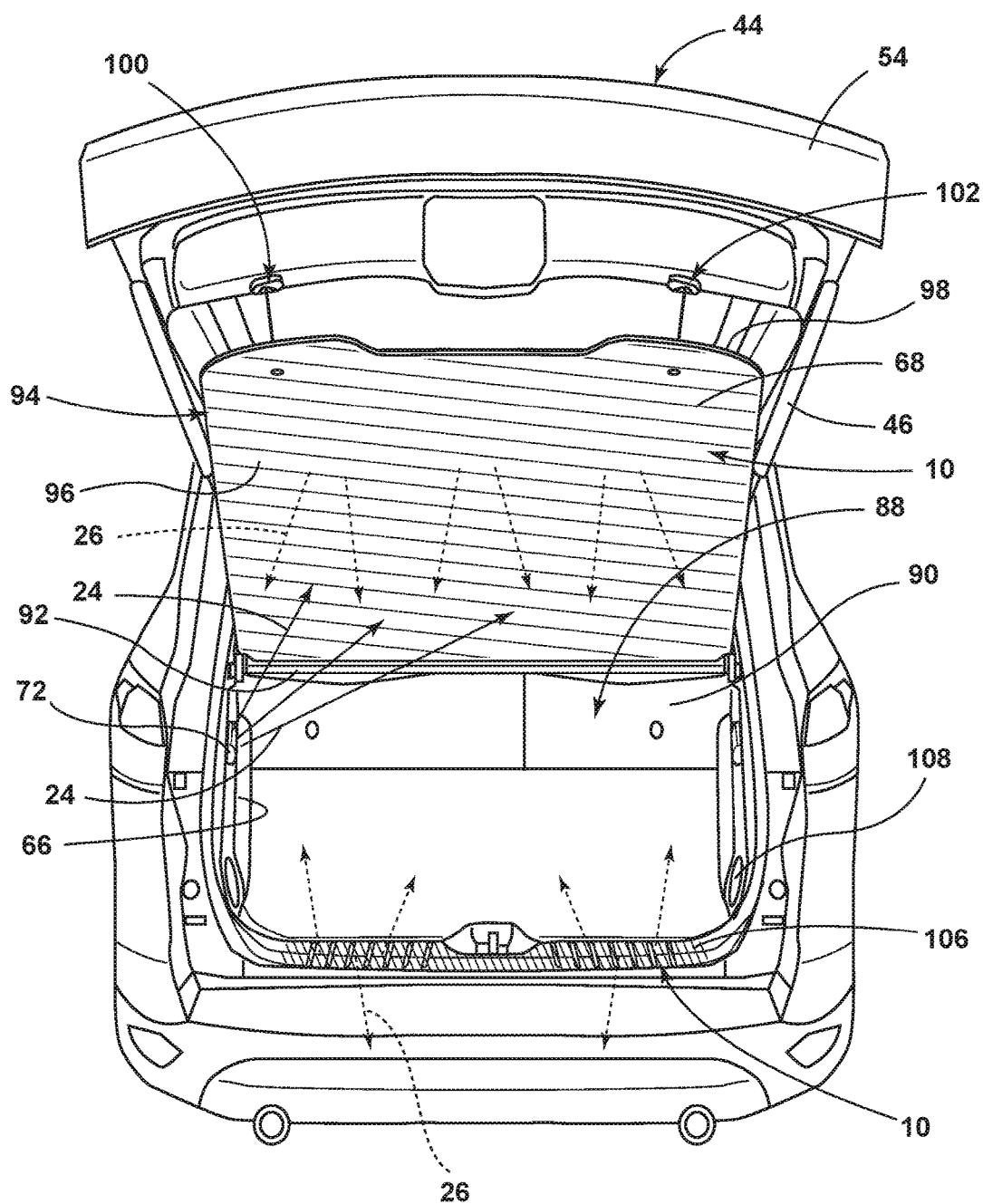
FIG. 6 is a rear perspective view of the vehicle having the photoluminescent structure on a bottom surface of a sheet of the cargo shade assembly, according to one aspect.

Referring to FIG. 6, the photoluminescent structure 10 may be disposed on a bottom surface 106, and/or a top surface, of the sheet 94. The lighting assembly 50 may be vertically disposed below the sheet 94 and the light source 72 therein may be configured to direct excitation light 24 towards the photoluminescent structure 10 to provide illumination of the cargo area.

According to one embodiment, a film 104 (FIG. 9) with a photoluminescent structure 10 therein may be adhered to the bottom surface 106 of the sheet 94. Additionally, and/or alternatively, the photoluminescent structure 10 may be painted, sprayed, or otherwise disposed on the sheet 94 and/or any desired interior panel 66 within the vehicle 28. For example, an additional photoluminescent structure 10 may be disposed on a rear trim member of the vehicle 28. Additional components that may include a photoluminescent structure thereon or therein include, but are not limited to, the rear portion 88 of the vehicle seat 90, one or more interior panels 66, a headliner, a rear mounted speaker 108, or any other desired component that may be operably coupled with the light source 72 through the use of optics 76.

According to one embodiment, the photoluminescent structure 10 may luminesce in a substantially white color in response to receiving excitation light 24, which may be emitted by the light source 72 in the blue wavelength spectrum. The light source 72 may vary the intensity of the excitation light 24 emitted therefrom such that the intensity of luminescence may also be varied based on a predefined event and/or a user preference. For example, the current may vary from 1 to 5 times the steady state current.

Figure 7:
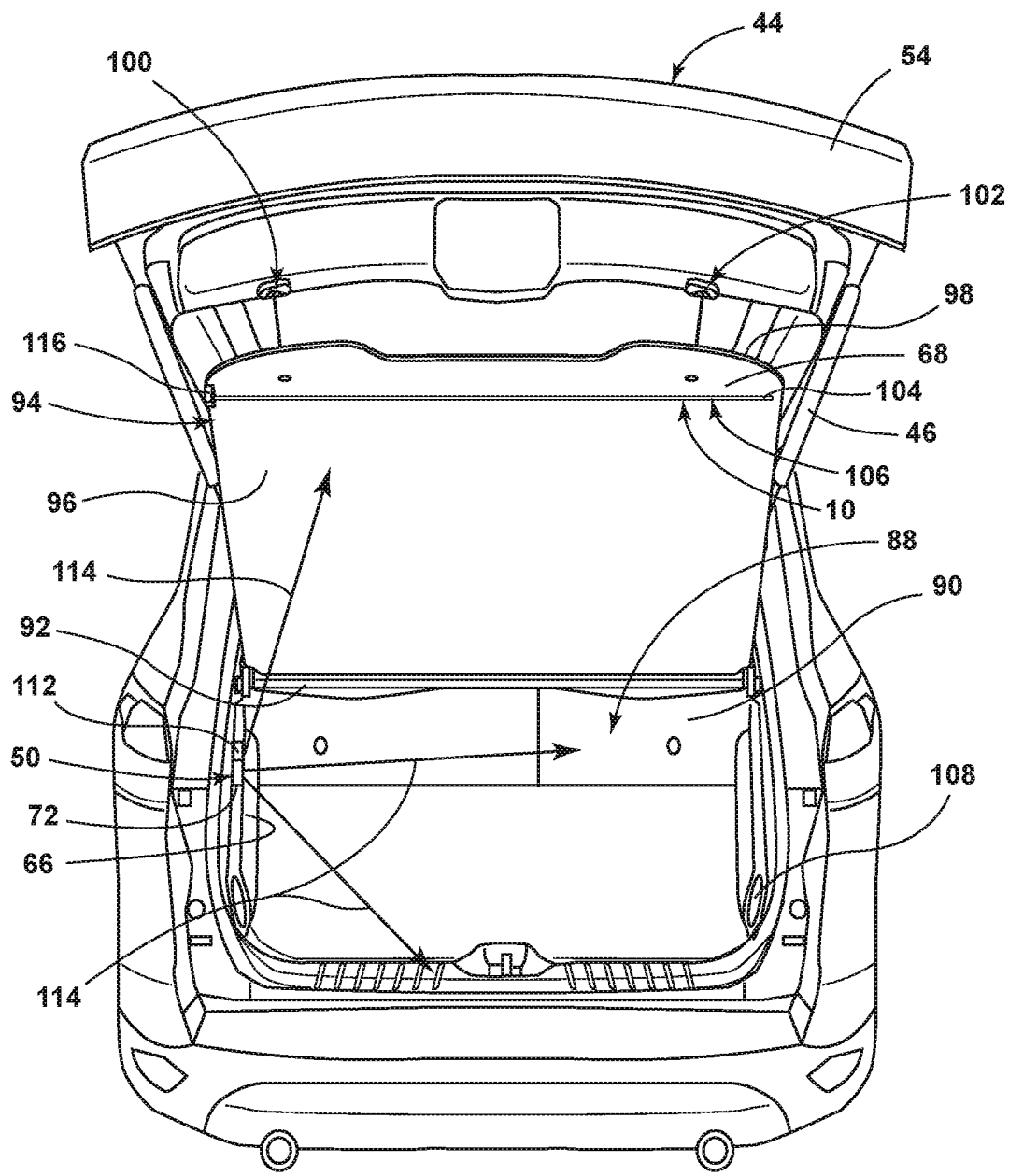
FIG. 7 is a rear perspective view of the vehicle, according to one aspect, having a switch within the lighting assembly for determining the placement of the sheet and/or the rear door.
Figure 8:
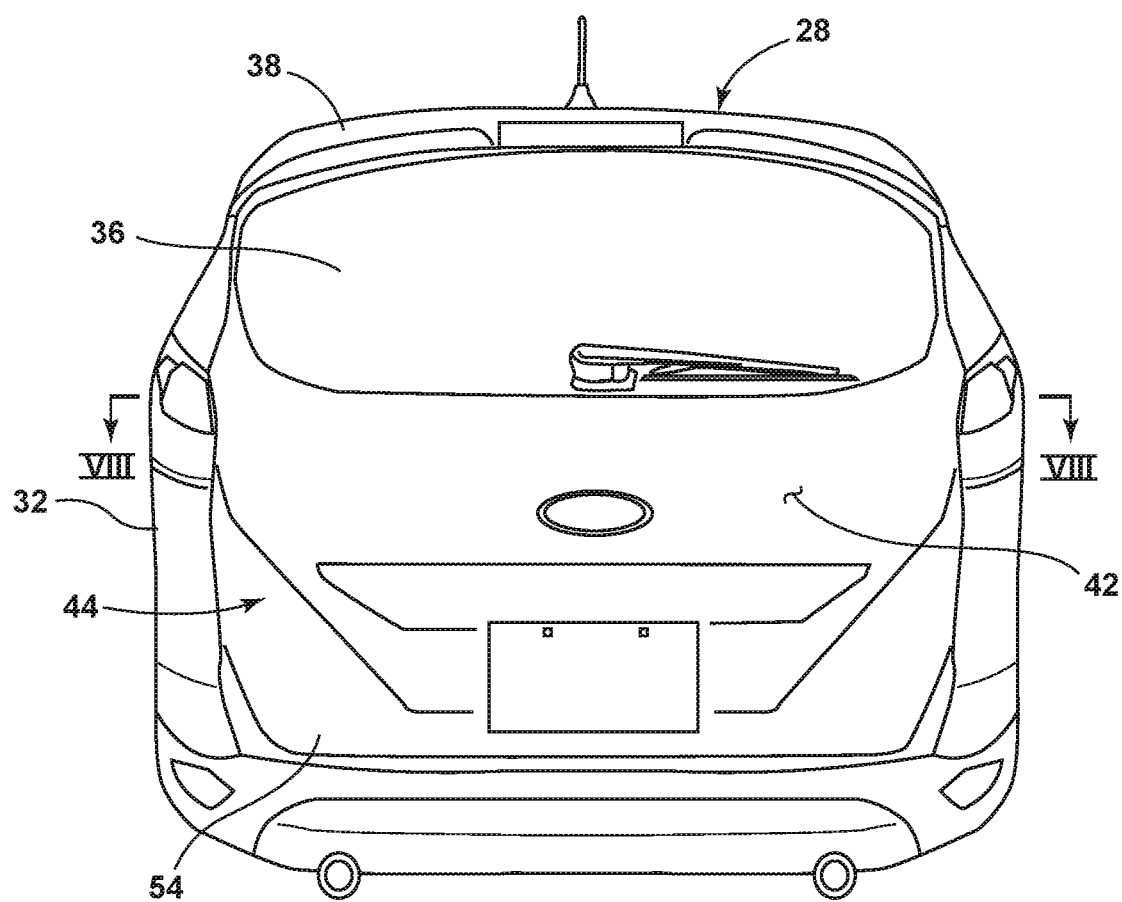
FIG. 8 is a rear perspective view of the vehicle having the hatch in a closed position.
Figure 9:
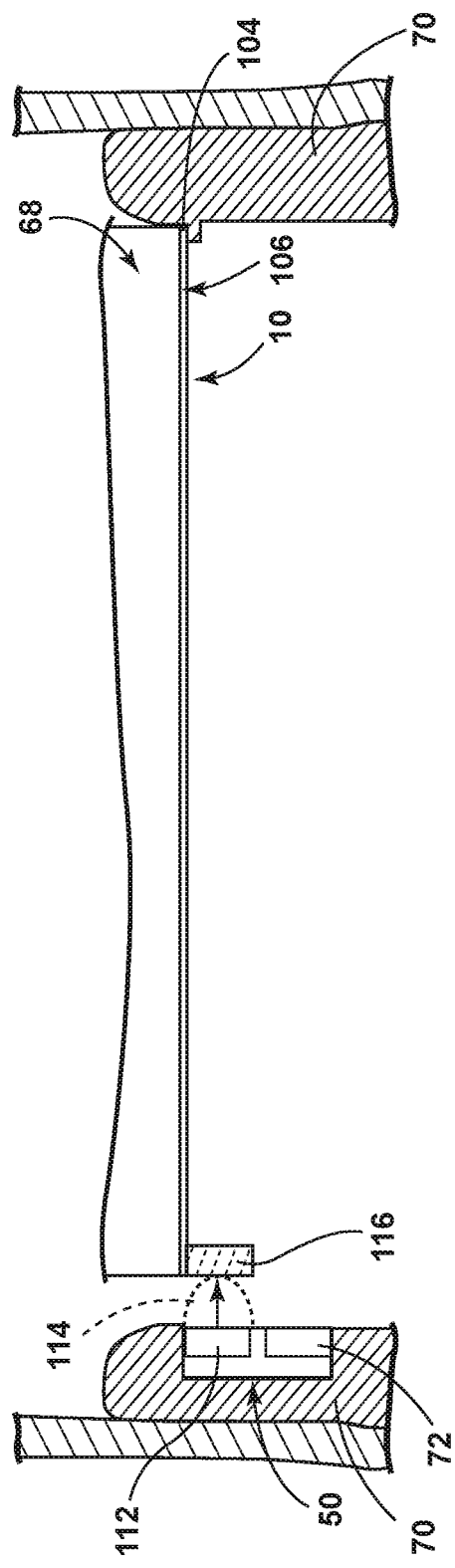
FIG. 9 is a cross-sectional view of the sheet taken along the line VIII-VIII of FIG. 8 illustrating an elongated member extending from the sheet.

Referring to FIGS. 7-9, the lighting assembly 50 may further include a switch 112 therein, which may also be disposed on the PCB, which is able to detect the presence of nearby objects with and/or without any physical contact. For example, the switch 112 may be configured as a proximity sensor that emits an electromagnetic field 114 or a beam of electromagnetic radiation (infrared, for instance), and senses changes in the field 114 or a return signal. According to one embodiment, the proximity sensor is configured to detect a downwardly extending member disposed on the cargo shade assembly 68. Accordingly, the controller 74 may place the light source 72 in an unilluminated state when the member is disposed proximately to the switch 112. Conversely, when the member is not disposed proximately to the proximity sensor, which may indicate an open rear door 44 condition, the light source 72 is placed in an illuminated state thereby exciting the photoluminescent structure 10.

Additionally, the switch 112 may be configured to detect movement within the cargo compartment 42 or proximately thereto and illuminate the light source 72 in response to the movement. For example, the switch 112 may detect the opening of the hatch 54, the approaching of an occupant, or any other movement. It will be appreciated that switch 112 may be configured as any manual, mechanical, optical (presence or absence), magnetic, eddy current, capacitive, light, etc. switch known in the art without departing form the scope of the present disclosure.

A motion sensor 118 may also be used in conjunction with the lighting assembly 50 for differentiating between movement in the cargo compartment 42 of the vehicle 28 from movement in a rear portion of the vehicle seat 90 and/or for determining whether the cargo shade assembly 68 has been removed from the vehicle 28. The motion sensor 118 may be integrated into the lighting assembly 50, disposed on the PCB, and/or disposed independently within the vehicle 28.

Figure 10:
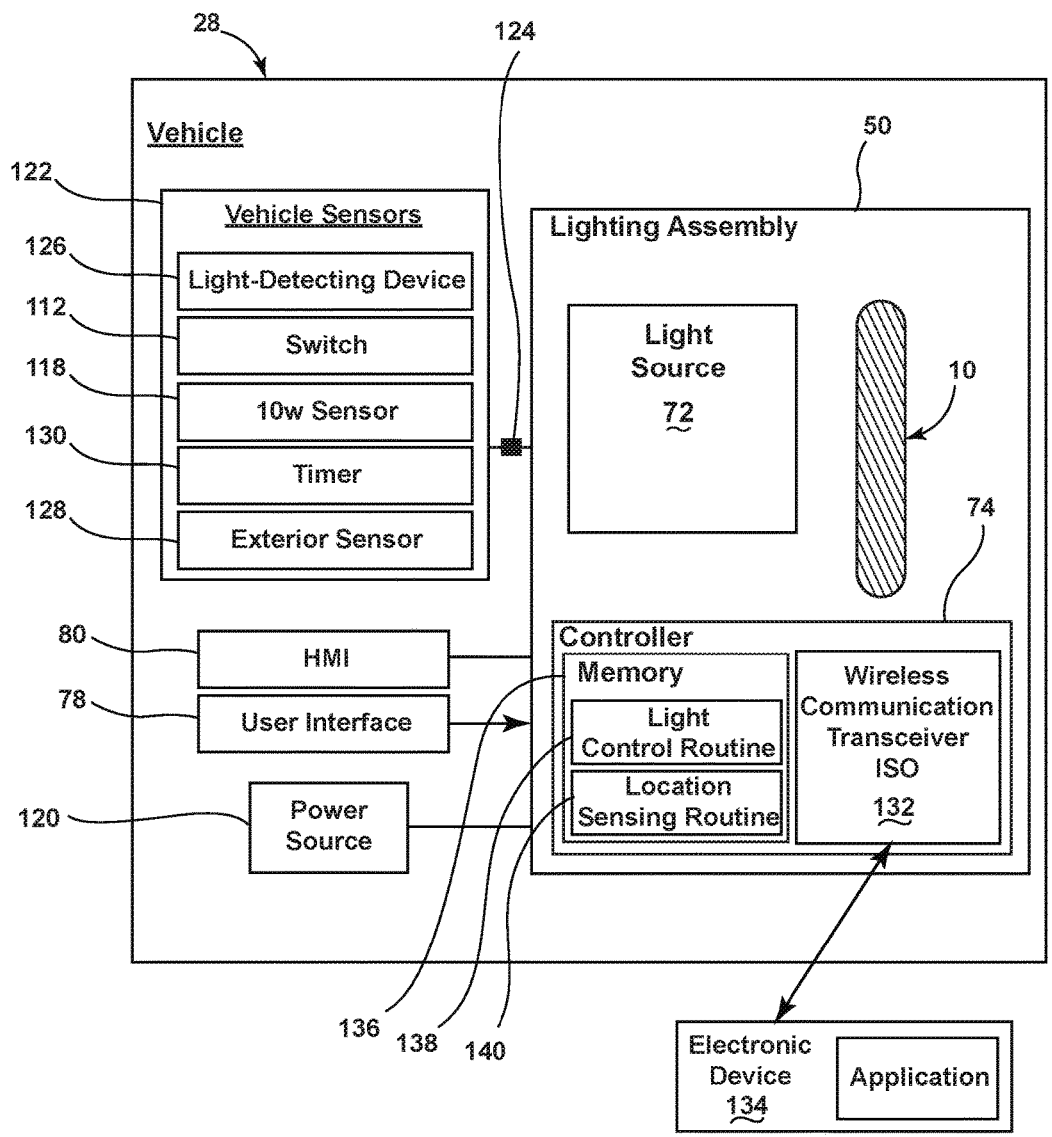
FIG. 10 is a block diagram of the vehicle having the lighting assembly employed therein.

Referring to FIG. 10, a block diagram of the vehicle 28 is shown in which the lighting assembly 50 is positioned on the vehicle 28. A power source 120 is connected to the lighting assembly 50 to provide power to the light source 72. The lighting assembly 50, and the vehicle 28, may also be equipped with one or more sensors for initiating the light source 72.

The one or more vehicle sensors 122 that may be used in conjunction with the lighting assembly 50 may communicate with the lighting assembly 50 through a multiplex communication bus 124. The multiplex communication bus 124 may be disposed within the lighting assembly 50 and/or the vehicle 28. For example, the vehicle 28 may include a light-detecting device 126, the first sensor, as described above, the motion sensor 118, as described above, an exterior sensor 128, and/or any other sensor that may be disposed within a vehicle 28. A timer 130 may also operate in conjunction with one or more of the vehicle sensors 122.

The light-detecting device 126 may be utilized for varying the intensity of excitation light 24 emitted from the light source 72. The light-detecting device 126 may be integrated into the vehicle 28 or into the lighting assembly 50. The light-detecting device 126 senses the environmental lighting conditions, such as whether the vehicle 28 is in day-like conditions (i.e., higher light level conditions) and/or whether the vehicle 28 is in night-like conditions (i.e., lower light level conditions). The light-detecting device 126 can be of any suitable type, and can detect the day-like and night-like conditions in any suitable fashion. For instance, in one embodiment, the light-detecting device 126 includes a light sensor that detects the amount of light (e.g., solar radiation) affecting the vehicle 28 for determining whether day-like or night-like conditions exist. According to one embodiment, a lower initial intensity of excitation light 24 may be emitted by the light source 72 when the light-detecting device 126 senses night-like conditions. A higher initial intensity of excitation light 24 may be emitted when the light-detecting device 126 senses day-like conditions.

As described above, the switch 112 may be configured as a proximity sensor and/or a mechanical switch that is configured to toggle the light source 72 between an illuminated and an unilluminated state. The motion sensor 118 may be configured to detect a directionality motion such that motion in a desired location, such as within the cargo compartment 42 or externally from the vehicle 28, may illuminate the light source 72 while motion outside of the desired area, such as in the rear seating area does not illuminate the light source 72.

A timer 130 may be used in conjunction with any sensor for toggling the light source 72 between illuminated and unilluminated states. For example, according to one embodiment, if the rear door 44 and/or sheet 94 are disposed in an open position for an elongated period of time, such as more than 15 seconds, the excitation light 24 may be emitted from the light source 72 at an increasing intensity, such as between 1 and 5 times normal intensity to increase visibility within the cargo compartment 42.

Any exterior sensor(s) 128, such as ultrasonic sensors or imaging sensors, may be disposed around the exterior of the vehicle 28 and determine approaching occupants of the vehicle 28. The controller 74 may illuminate the light source 72 if approaching occupants are detected.

In operation, the light source 72 may be activated using a variety of means. For example, the vehicle 28 may include a user interface 78. In some instances, the user interface 78 may be part of the HMI 80 disposed within the vehicle 28, or the user interface 78 may work in conjunction with the HMI 80. The user interface 78 may be configured such that a user may control the wavelength of excitation light 24 that is emitted by the light source 72 and/or the wavelength of light emitted by the light source 72. Additionally, or alternatively, the user interface 78 may be used to switch the lighting assembly 50 through a plurality of modes and/or functions. The user interface 78 may use any type of control known in the art for controlling the light source 72, such as, but not limited to, switches (e.g., proximity sensors, push-type buttons) and may be disposed in any practicable location.

The lighting assembly 50, or the vehicle 28, may further include one or more of the wireless communication transceivers 132 that may be configured to interact with an electronic device 134. The wireless communication transceivers 132 may communicate with the electronic device 134 over a wireless signal (e.g., radio frequency). The electronic device 134 may include a cellphone, a tablet, a key fob, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic).

In one non-limiting example, the wireless communication transceivers 132 may be a Bluetooth™ RN4020 module, or an RN4020 Bluetooth™ low energy PICtail board configured to communicate with the electronic device 134 using Bluetooth™ low energy signals. The wireless communication transceivers 132 may include a transmitter and a receiver to transmit and receive wireless signals (e.g., Bluetooth™ signals) to and from the electronic device 134. It will be appreciated that the wireless communication transceivers 132 may utilize other forms of wireless communication between with the electronic device 134 and other wireless communication transceivers 132, such as Wi-Fi™.

The wireless communication transceivers 132 may be positioned on or within the controller 74. The controller 74 may be a dedicated controller or may be a shared controller (e.g., for multiple light assemblies or light assemblies for other body features). The controller 74 may include a processor and a memory 136 for executing stored routines or for storing information (e.g., related to the operation of the lighting assembly 50 and/or the electronic device 134). The wireless communication transceiver 132 is configured to communicate with the processor such that one or more of the routines 138, 140 stored in the memory 136 is activated.

The electronic device 134 may include one or more routines 138, 140, which control the communication between the wireless communication transceiver 132 and the electronic device 134. For example, in cellphone embodiments of the electronic device 134, the cellphone may include one or more applications 142 configured to communicate with the wireless communication transceivers 132. In the depicted embodiment, the memory 136 of the controller 74 includes a light control routine 138 and a location sensing routine 140. In various embodiments, the wireless communication transceiver 132 is a standalone device that is not in communication with body control modules, electronic control modules, engine control modules and/or other features of the vehicle 28. For example, the wireless communication transceivers 132 may only be capable of communication with the lighting assembly 50 and the electronic device 134. In other embodiments, the wireless communication transceivers 132 may communicate with the body controller and/or other onboard controllers.

The vehicle 28 may include a plurality of wireless communication transceivers 132, similar to that described in connection with the lighting assembly 50, positioned around the vehicle 28 (e.g., rear, sides, or front of the vehicle 28). The wireless communication transceivers 132 may be in communication with one another or may mutually communicate with a master controller or module (e.g., body control module). The wireless communication transceivers 132 may be disposed within other accessories of the vehicle 28, or may be stand alone units. The electronic device 134 may communicate with all, some, or none of the wireless communication transceivers 132 as the electronic device 134 enters and exits the communication range of the transceivers 132. Each of the wireless communication transceivers 132 may be aware of its location within the vehicle 28 and capable of sharing its location with the electronic device 134.

In various embodiments, the wireless communication transceivers 132 are capable of communicating with the electronic device 134 such that the location of the electronic device 134 may be determined therefrom (e.g., based on signal strength and/or return time of the signal) or vice versa. According to one embodiment, the location sensing routine 140 in the memory 136 of the controller 74 may utilize the signal strength and time to return of the signals between the plurality of wireless communication transceivers 132 and the electronic device 134 to triangulate the position of the electronic device 134 as the occupant moves around and inside and/or outside of the vehicle 28. In embodiments where the wireless communication transceivers 132 communicate with a master module, the location of the electronic device 134 may be calculated in the master module. The location of the electronic device 134 may have sufficient resolution to determine which door of the vehicle 28 the occupant is approaching. The electronic device 134 may then share its determined location with the wireless communication transceivers 132 such that appropriate features (e.g., illumination of the cargo compartment 42) may be activated by the appropriate transceivers 132. It will be understood that the location sensing routine 140 may be located on the electronic device 134 and that any location determinations may be made by the electronic device 134 and shared with the wireless communication transceivers 132 without departing from the spirit of this disclosure.

The light control routine 138 may process signals from the wireless communication transceiver 132 (e.g., the location of the electronic device 134) to activate the lighting assembly 50. Depending on the signals received from the wireless communication transceiver 132 and/or the vehicle sensors 122, the light control routine 138 may be activated. The light control routine 138 may store a predetermined illumination sequence for the lighting assembly 50 based on detected properties of the electronic device 134 (e.g., known or unknown device, location, and user specific data). For example, the light control routine 138 may control the lighting assembly 50 to follow the electronic device 134 by activating an illumination sequence based on the position of the electronic devices 134. The electronic device 134 may store user specific data and preferences relating to the lighting assembly 50 (e.g., color, intensity, pattern, activation distance, etc.) and/or the memory 136 (e.g., the light control routine 138) may store this data.

Choosing which electronic devices 134 should be trusted, and, therefore, given access to command of the controller 74 and/or the wireless communication transceiver 132 (e.g., the lighting assembly 50) may be determined based on whether the electronic device 134 has been inside of the vehicle 28 before. The memory of the wireless communication transceivers 132 may store identifying information relating to electronic devices 134 which were detected within the vehicle 28 (e.g., using the location sensing routine 140) and which may therefore be generally regarded as "friendly" and/or as the owner of the vehicle 28.

In an exemplary method of determining that an unknown electronic device 134 is friendly, the wireless communication transceivers 132 detect the presence of an unknown electronic device 134, detect a characteristic signal shift (e.g., attenuation or increase in signal at corresponding wireless communication transceivers 132) indicative of the unknown electronic device 134 entering or being within the vehicle 28 across multiple wireless communication transceivers 132, and store characteristic information about the electronic device 134 for future identification. It will be understood that a determination of the location of the electronic device 134 to be within the vehicle 28 may also prompt a storing of the characteristic information about the electronic device 134 for future identification. Utilizing the past and/or present location of the electronic device 134 as a security feature to determine if it is allowed access to the controller 74 may be particularly advantageous as the replication of signal shifting indicative of the electronic device 134 entering the vehicle 28 and the location of the electronic device 134 is particularly difficult to fake. Further, it will be understood that more conventional methods of connecting electronic devices 134, such as pairing and manually connecting, may also be utilized to designate friendly devices 134.

Integration of vehicle sensors 122 and/or detection of the electronic devices 134 by the wireless communication transceivers 132 may allow for a variety of lighting controls to be affected and illumination sequences to be activated. As described herein, the electronic devices 134 may be used for determining a location of the occupant. Accordingly, the lighting assembly 50 may illuminate as an occupant approaches the vehicle 28 and/or uses the cargo compartment 42.

Detection of location of the electronic device 134 relative to the vehicle 28 also permits the wireless communication transceivers 132 to determine if an unrecognized electronic device 134 is proximate the vehicle 28. Such an unrecognized electronic device 134 may be owned or carried by a potential burglar or threat to the vehicle 28.

In events where an unrecognized electronic device 134 is detected proximate the vehicle 28 for greater than a predetermined time, the wireless communication transceivers 132 may activate one or more countermeasures. Countermeasures may include a strobe light from the lighting assembly 50 or directing light from the electronic device 134. In some embodiments, any available identifying information about the electronic device 134 may be stored for later retrieval if the owner of the vehicle's electronic device 134 is not detected proximate the vehicle 28 at the same time. The wireless communication transceivers 132 may store greater than fifty electronic devices 134 that may have been a threat.

In operation, each photoluminescent structure 10 may exhibit a constant unicolor or multicolor illumination. For example, the controller 74 may prompt the light source 72 to emit only a first wavelength of excitation light 24 to cause the photoluminescent structure 10 to luminesce in the first color (e.g., white). Alternatively, the controller 74 may prompt the light source 72 to emit only a second wavelength of excitation light 24 to cause the photoluminescent structure 10 to luminesce in the second color (e.g., blue). Alternatively still, the controller 74 may prompt the light source 72 to simultaneously emit the first and second wavelengths of excitation light 24 to cause the photoluminescent structures 10 to luminesce in a third color (e.g., light blue) defined by an additive light mixture of the first and second colors. Moreover, additional photoluminescent structures 10 may be added to the lighting assembly 50 that convert the excitation light 24 emitted from the light source 72 to a different wavelength. Alternatively still, the controller 74 may prompt the light source 72 to alternate between periodically emitting the first and second wavelengths of excitation light 24 to cause the photoluminescent structure 10 to periodically luminesce by alternating between the first and second colors of converted light 26. The controller 74 may prompt the light source 72 to periodically emit the first and/or second wavelengths of excitation light 24 at a regular time interval and/or an irregular time interval.

With respect to the above examples, the controller 74 may modify the intensity of the emitted first and second wavelengths of excitation light 24 by pulse-width modulation or current control. In some embodiments, the controller 74 may be configured to adjust a color of the converted light 26 by sending control signals to adjust an intensity or energy output level of the light source 72. For example, if the light source 72 is configured to output the excitation light 24 at a low level, substantially all of the excitation light 24 may be converted to the outputted, visible converted light 26. If the light source 72 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 74 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the lighting assembly 50. As described herein, the color of the converted light 26 may be significantly dependent on the particular photoluminescent material 18 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 72, the concentration and proportions of the photoluminescent materials 18 in the photoluminescent structure 10 and the types of photoluminescent materials 18 utilized in the photoluminescent structure 10 discussed herein may be operable to generate a range of color hues of outputted light by blending the excitation light 24 with the converted light 26. It is also contemplated that the intensity of each light source 72 may be varied simultaneously, or independently, from any number of other light sources 72.

A variety of advantages may be derived from the use of the present disclosure. For example, use of the disclosed lighting assembly 50 may allow for consistent lighting of the cargo compartment 42 of the vehicle 28. Further, use of the wireless communication transceivers 132 allows for the lighting assembly 50 to be activated as a person approaches. Further, due to the low package space requirements of the lighting assembly 50, the lighting assembly 50 may be adhesively bonded within any interior portion of the vehicle 28. Finally, use of the wireless communication transceivers 132 allows for a low consumption of power from the vehicle 28 while the vehicle 28 is not in use.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
   a trunk door coupled to a body structure and movable between first and second positions to provide access to a vehicle interior portion; and
   a photoluminescent structure disposed on an interior surface of the trunk door and configured to luminesce in response to excitation light emitted by a light source, the light source separately and vertically disposed below the photoluminescent structure on the trunk door in the first and second positions.

2. The vehicle of claim 1, wherein light emitted from the source comprises one of a blue light, violet light, IR light, and a UV light.

3. The vehicle of claim 1, wherein the photoluminescent structure comprises at least one photoluminescent material configured to convert an excitation light received from at least a portion of the light source into a visible, converted light.

4. The vehicle of claim 1, wherein the door includes an interior trim material thereon and the photoluminescent structure is disposed within the trim material.

5. The vehicle claim 1, further comprising:
   a controller for controlling an activation state of the light source in response to the sensor determining that the door has moved from the first position to the second position or the second position to the first position.

6. A vehicle comprising:
   a cargo shade assembly disposed in a cargo compartment and movable between first and second positions; and
   a first light source separately disposed and operably coupled with a first photoluminescent structure on the cargo shade assembly in the first and second positions, the first photoluminescent structure configured to luminesce in response to excitation by the first light source.

7. The vehicle of claim 6, further comprising:
   a second photoluminescent structure adjacently disposed to the first photoluminescent structure, wherein the first photoluminescent structure luminesces in a first color and the second photoluminescent structure luminesces in a second, different color in response to excitation by the first light source.

8. The vehicle of claim 6, further comprising:
   a switch disposed within the cargo compartment and configured to detect the first or second position of the cargo shade assembly, wherein the light source is illuminated when the switch detects movement from the first position to the second position.

9. The vehicle of claim 7, further comprising:
   a second light source configured to emit excitation light at a varied wavelength from the first light source, the first and second light sources located on opposing sides of the cargo compartment.

10. The vehicle of claim 9, wherein the first light source emits excitation light to excite the first photoluminescent structure and the second light source emits excitation light to excite the second photoluminescent structure.

11. The vehicle of claim 6, further comprising:
    a motion sensor for differentiating between movement in the cargo compartment of the vehicle from movement in a rear seating portion of the vehicle.

12. The vehicle of claim 6, further comprising:
    a motion sensor for determining whether the cargo shade assembly has been removed from the vehicle.

13. The vehicle of claim 6, wherein light emitted from the source comprises one of a blue light, violet light, IR light, and a UV light.

14. A vehicle comprising:
    a cargo shade assembly movable between first and second positions disposed over a cargo compartment of a vehicle; and
    a photoluminescent structure entirely disposed on the cargo shade assembly and configured to luminesce in response to excitation by a separately disposed light source, the light source operably coupled with the photoluminescent structure in both the first and second positions.

15. The vehicle of claim 14, wherein light emitted from the source comprises one of a blue light, violet light, IR light, and a UV light.

16. The vehicle of claim 14, wherein the photoluminescent structure comprises at least one photoluminescent material configured to convert an excitation light received from at least a portion of the light sources into a visible, converted light.

17. The vehicle claim 14, wherein the cargo shade assembly includes a cover sheet and a member thereon for cooperating with a switch for determining a positional state of the sheet.

* * * * *